United States Patent
O'Connor et al.

(10) Patent No.: US 8,448,239 B2
(45) Date of Patent: *May 21, 2013

(54) SECURE CONTROLLER FOR BLOCK ORIENTED STORAGE

(75) Inventors: Dennis M. O'Connor, Chandler, AZ (US); Mark N. Fullerton, Austin, TX (US); Ray Richardson, Chandler, AZ (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,379

(22) Filed: Mar. 5, 2011

(65) Prior Publication Data

US 2011/0154480 A1    Jun. 23, 2011

Related U.S. Application Data

(63) Continuation of application No. 11/027,913, filed on Dec. 28, 2004, now Pat. No. 7,904,943.

(51) Int. Cl.
    *G06F 21/00* (2006.01)
(52) U.S. Cl.
    USPC ...... 726/16; 726/1; 726/2; 711/163; 711/170; 711/173; 711/220; 710/22; 710/24; 710/36; 710/200; 710/262; 713/189; 713/193; 713/194; 713/200
(58) Field of Classification Search
    USPC .............. 726/1, 2, 16; 711/163, 170, 173, 711/220; 710/22, 24, 36, 200, 262; 713/189, 713/193, 194, 200
    See application file for complete search history.

(56) References Cited

U.S. PATENT DOCUMENTS

| | | | |
|---|---|---|---|
| 5,862,407 A | 1/1999 | Sriti | |
| 6,336,187 B1 | 1/2002 | Kern et al. | |
| 6,651,171 B1 | 11/2003 | England et al. | |
| 6,678,755 B1 * | 1/2004 | Peterson et al. | 710/24 |
| 6,934,817 B2 | 8/2005 | Ellison et al. | |
| 7,177,972 B2 | 2/2007 | Watanabe | |
| 7,277,972 B2 | 10/2007 | Moyer et al. | |
| 2002/0161941 A1 | 10/2002 | Chue et al. | |
| 2003/0172214 A1 | 9/2003 | Moyer et al. | |
| 2003/0200451 A1 | 10/2003 | Evans et al. | |
| 2004/0044906 A1 | 3/2004 | England et al. | |
| 2004/0088513 A1 | 5/2004 | Biessener et al. | |
| 2004/0187019 A1 * | 9/2004 | Nanki et al. | 713/200 |
| 2004/0243823 A1 | 12/2004 | Moyer et al. | |
| 2005/0114616 A1 * | 5/2005 | Tune et al. | 711/163 |
| 2006/0048221 A1 | 3/2006 | Morais et al. | |
| 2006/0123172 A1 | 6/2006 | Herrell et al. | |
| 2006/0149917 A1 | 7/2006 | O'Connor et al. | |

* cited by examiner

*Primary Examiner* — Brandon Hoffman
*Assistant Examiner* — Hee Song
(74) *Attorney, Agent, or Firm* — Dorsey & Whitney LLP

(57) ABSTRACT

A storage controller includes a command pointer register. The command pointer register points to a chain of commands in memory, and also includes a security status field to indicate a security status of the first command in the command chain. Each command in the command chain may also include a security status field that indicates the security status of the following command in the chain.

19 Claims, 6 Drawing Sheets

SECURE CONTROLLER FOR BLOCK ORIENTED STORAGE

RELATED APPLICATIONS

This application is a Continuation of U.S. Nonprovisional application Ser. No. 11/027,913, by O'Connor et al., filed Dec. 28, 2004, and issued as U.S. Pat. No. 7,904,943. This application and patent are incorporated herein by reference in their entirety, for any purpose.

FIELD

The present invention relates generally to integrated circuits, and more specifically to integrated circuits that include storage controllers.

BACKGROUND

A microprocessor may include the ability to run in various modes. For example, some processor cores licensable from ARM Holdings plc, Cambridge, UK, can run in a user mode as well as a privileged mode. Privileged mode is typically used by operating system (OS) processes, and user mode is typically used by application processes.

Processors may also include the ability to run processes in a secure mode or non-secure mode, and may be able to access secure resources and non-secure resources. For example, secure processes may be able to access secure resources, and non-secure processes may be able to access non-secure resources.

DESCRIPTION OF EMBODIMENTS

Figure 1:
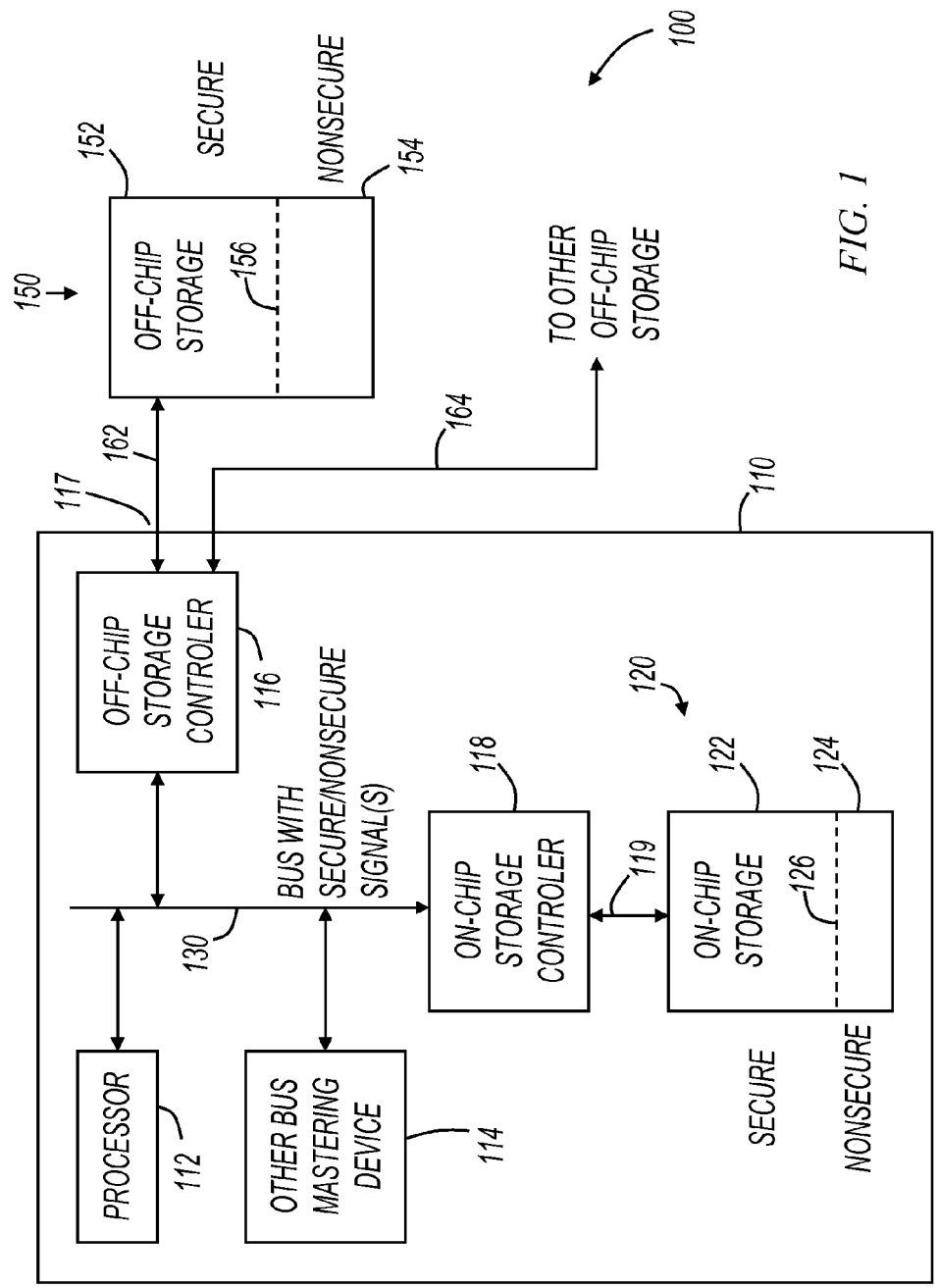
FIG. 1 shows a block diagram of an electronic system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of an electronic system. System 100 includes system-on-chip (SOC) 110 and off-chip storage 150. In some embodiments, SOC 110 is an integrated circuit that includes many components. As shown in FIG. 1, SOC 110 includes processor 112, bus mastering device 114, storage controllers 116 and 118, and on-chip storage 120. As used herein, the term "system-on-chip" and the acronym "SOC" do not imply any particular level of integration. For example, in some embodiments, an SOC may include only a processor and a storage controller, or a bus mastering device and a storage controller. Also for example, in some embodiments, an SOC may include all of the components shown in FIG. 1 in addition to others.

Storage devices 120 and 150 may be any type of block oriented storage devices. For example, on-chip storage 120 may be block oriented Flash memory. Also for example, off-chip storage 150 may be a disk drive, block oriented Flash memory, or the like. Accordingly, storage controllers 116 and 118 may be Flash controllers, hard disk controllers, or any other type of block oriented controllers.

Storage controllers 116 and 118 are command-chain-driven bus-mastering devices that read a list of commands from memory and then perform data transfers between the storage that it controls and devices elsewhere in system 100. For example, on-chip storage 120 may be a Flash memory device, and storage controller 118 may be a Flash controller. Also for example, off chip storage 150 may be a disk drive, and storage controller 116 may be a disk drive controller. Examples of command chains in memory are described below with reference to FIG. 2.

Processor 112 and bus mastering device 114 are examples of bus mastering devices. For example, processor 112 may take control of bus 130 when communicating with other components within SOC 110. Also for example, other bus mastering device 114 may be a direct memory access (DMA) controller that may take control of bus 130 to communicate with other components within SOC 110. Any number of processors and bus mastering devices may be included in SOC 110 without departing from the scope of the present invention.

Processor 112 is any processor that may run in a secure mode or a non-secure mode. For example, processor 112 may be a processor core capable of running in a privileged mode and a user mode, or any number of modes with varying security levels. Likewise, bus mastering device 114 may be any other type of device that may run in a secure mode, a non-secure mode, or modes with varying security levels. Further, in some embodiments, bus mastering device 114 may be a bus mastering device that is limited to running in only a secure mode or only a non-secure mode.

Processor 112 and bus mastering device 114 communicate with storage controllers 116 and 118 over bus 130. In some embodiments, bus 130 includes one or more signal paths that carry information to identify the security mode in which the bus master is operating. For example, processor 112 may assert a single bit on bus 130 to signify whether processor 112 is operating in secure mode or non-secure mode. In other embodiments, processor 112 may assert a plurality of bits on bus 130 to indicate the security level at which processor 112 is operating. In these various embodiments, bus 130 may include a varying number of signal paths to accommodate the bits that signify the secure mode or security level.

Storage controllers 116 and 118 communicate with off-chip storage 150 and on-chip storage 120, respectively. Off-chip storage controller 116 provides an interface between a bus master in SOC 110 and off-chip storage 150, and on-chip storage controller 118 provides an interface between a bus master in SOC 110 and on-chip storage 120. For example, control signal lines 162 are coupled between storage controller 116 and off-chip storage 150, and control signal lines 119 are coupled between storage controller 118 and on-chip storage 120.

Storage controllers 116 and 118 receive information from, and provide information to, bus masters on bus 130. For example, a bus master may request that a storage controller perform one or more transactions in a storage device. In addition, a bus master may provide information describing the security mode or security level of the process requesting a transaction. For example, processor 112 may be running in a secure mode, and may request on-chip storage controller 118 to perform a block read or block write in on chip storage 120.

In some embodiments, storage controllers 116 and 118 perform block oriented transactions by reading a chain of commands from memory, and performing operations associated with the commands. For example, storage controller 118 may read a chain of commands and perform a block transfer in on-chip storage 120. Command chains are described more fully below with reference to FIG. 2.

In some embodiments, storage controllers 116 and 118 partition storage devices into multiple partitions. Partitions may be defined as secure partitions and non-secure partitions. Partitions may also be defined as partitions having varying levels of security. Further, partitions may be defined as regions in a storage device. For example, on-chip storage controller 118 may partition on-chip storage 120 into secure partition 122 and non-secure partition 124, where the partitions are shown separated at boundary 126. Also for example, off-chip storage controller 116 may partition off-chip storage 120 into secure partition 152 and non-secure partition 154 where the partitions are shown separated at boundary 156. Although each of on-chip storage 120 and off-chip storage 150 are shown having two partitions, this is not a limitation of the present invention. Any number of partitions may exist in a storage device.

The storage controllers may utilize various different apparatus to allow the specification of secure partitions and non-secure partitions. For example, in some embodiments of the present invention, each storage controller may maintain a range register and a direction bit. The range register may be programmed with a value that specifies a point in the storage device that divides the secure partition from the non-secure partition. For example, storage controller 118 may have a range register programmed with a value corresponding to the boundary shown at 126, and storage controller 116 may have a range register programmed with a value corresponding to the boundary shown at 156. The direction bit may be programmed to specify which side of the boundary is secure, and which side is non-secure. Example embodiments of storage controllers using range registers and direction bits are described in more detail below.

Off-chip storage controller 116 may control any number of storage devices. For example, as shown in FIG. 1, storage controller 116 provides control signal lines 162 to off-chip storage 120, and control signal lines 164 to other storage devices (not shown). Within SOC 110, control signal lines are provided between off-chip storage controller 116 and a chip boundary at 117.

Figure 2:
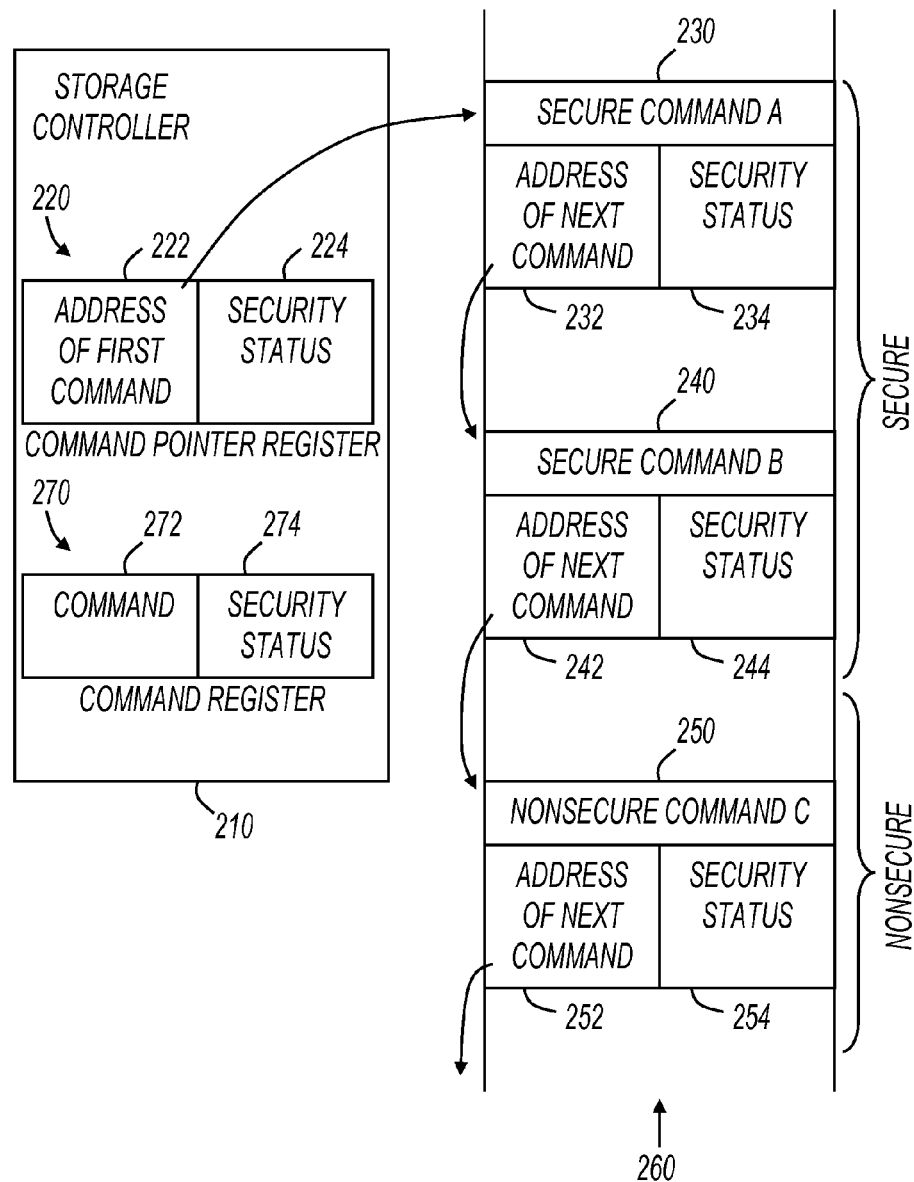
FIG. 2 shows a storage controller and a command chain in memory.

FIG. 2 shows a storage controller and a command chain in memory. Storage controller 210 is shown in FIG. 2 having command pointer register 220 and command register 270. Command pointer register 220 includes an address field 222 and a security field 224. Address field 222 may be written with the address of a first command in a command chain, and security field 224 may be written with information describing the security status of the first command in the command chain.

Command chain 260 is a list of commands including three commands shown at 230, 240, and 250. Each command is part of a node in the list of commands. For example, a first node in the list includes command 230, address field 232, and security field 234; a second node in the list includes command 240, address field 242, and security field 244; and a third node in the list includes command 250, address field 252, and security field 254. Each command is pointed to by an address field of the previous node in the list or the pointer register in the storage controller. For example, command 250 is pointed to by address field 242, command 240 is pointed to by address field 232, and command 230 is pointed to by address field 222.

Storage controller 210 may perform a transaction in a storage device by executing the commands in command chain 260. In the process of executing the commands, storage controller 210 may copy them into command register 270. For example, when command chain 260 is executed, storage controller 210 may begin by copying command 230 into command field 272 of command register 270, and copying security field 234 into security field 274 of command register 270. Command register 270 may or may not be visible to bus masters outside storage controller 210.

As shown in FIG. 2, in some embodiments, the security fields may include one or more secure/non-secure bit(s) describing the security status of the command that follows. For example, in some embodiments, a single bit may be utilized to indicate that the following command is either secure or non-secure. Also for example, in some embodiments, multiple bits may be utilized to indicate a security level of the command that follows. In still further embodiments, multiple bits may be utilized to signify a region of a block oriented storage device that may be accessed by the command that follows. The regions may be arranged in a hierarchy of more trusted to less trusted regions. For example, levels of security may be applied to the different regions.

An example is now described in which security fields include a single bit to signify that the following command is either secure or non-secure. In the example of FIG. 2, security field 224 would include a single bit set to "secure" to indicate that command 230 is a secure command. A secure command is a command that may access secure or non-secure areas of block oriented storage and other storage within the system. In operation, storage controller 210 copies command 230 and secure/non-secure bit 234 into command field 272 and security field 274, respectively. Storage controller 210 then executes the command, and follows the pointer to command 240. This process repeats until all commands in the chain are executed.

If the command chain begins with a secure command, any number of secure commands may follow. In these embodiments, the secure/non-secure bit is set to "secure" in each security field, and the storage controller can access secure and non-secure areas of the block oriented storage. Further, if the command chain begins with a secure command, the command chain may transition from secure commands to non-secure commands. For example, as shown in FIG. 2, security field 244 would include a bit to signify that the following command is non-secure.

If the command chain begins with a non-secure command, any number of non-secure commands may follow. In these embodiments, the secure/non-secure bit is set to "non-secure" in each security field, and the storage controller can only access non-secure areas of the block oriented storage. If the command chain begins with a non-secure command, attempting to transition to secure commands will either cause an error or cause an exception to be raised to a bus master. For example, if a command is non-secure, and a subsequent command is secure, storage controller 210 may alert a bus master that a non-secure command chain is attempting to execute a secure command. The bus master may then scrutinize the behavior, and either allow it or abort it.

Security field 224 can only be set to "secure" by a bus master operating in secure mode. A non-secure bus master may only set security field 224 to non-secure. If a non-secure bus master attempts to set security field 224 to "secure," an exception may be raised. This may occur when a non-secure process in a processor is attempting to cause storage controller 210 to execute a chain of secure commands.

Storage controller 210 may include one command pointer register that is written to each time a command chain is to be executed. In some embodiments, the storage controller may include multiple command pointer registers. For example, in a multi-processor system, a storage controller may include a separate command pointer register for each of several processors.

Figure 3:
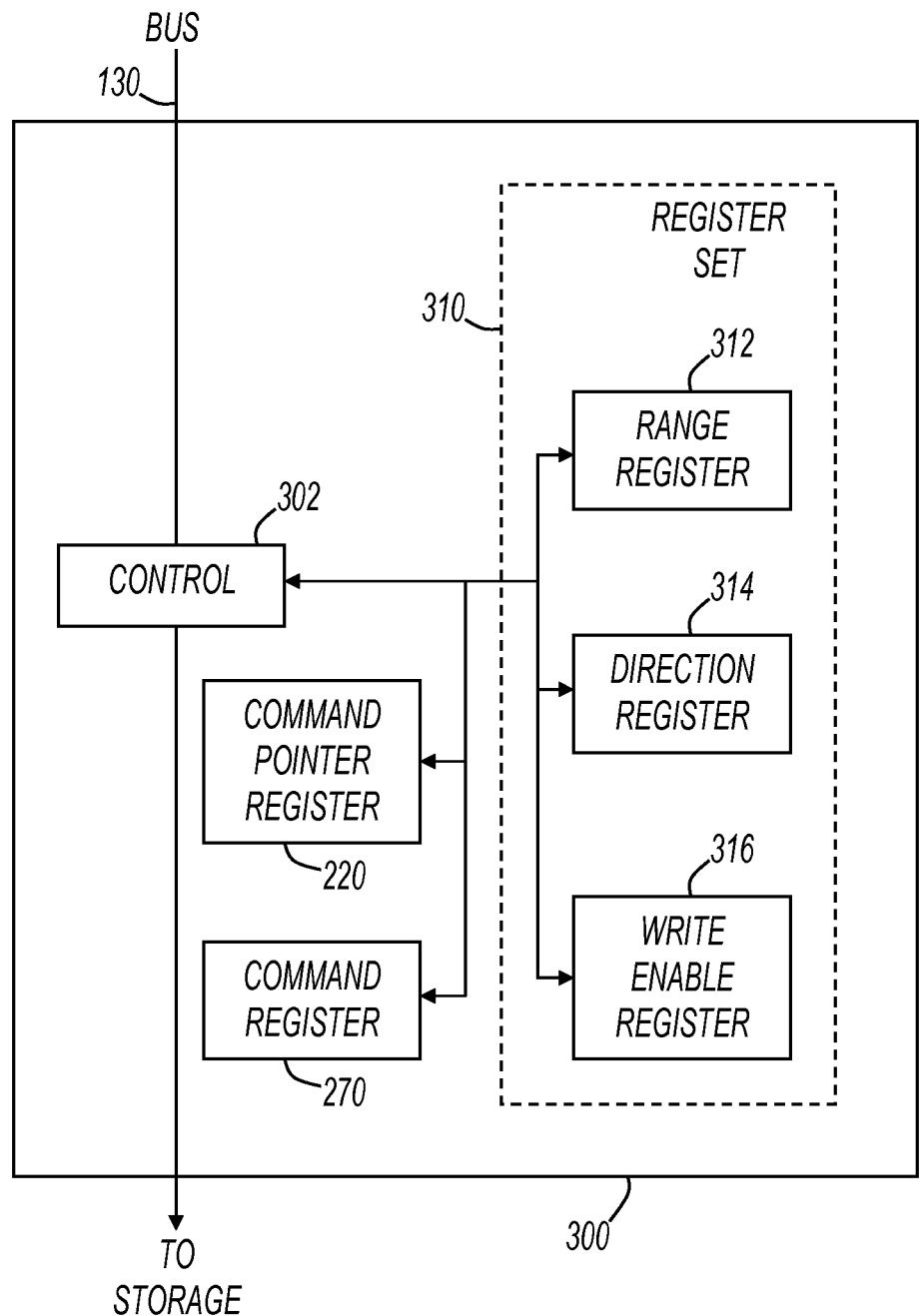
FIGS. 3 and 4 show block diagrams of storage controllers.

FIG. 3 shows a block diagram of a storage controller. In some embodiments, storage controller 300 may be utilized as a standalone storage controller, and in other embodiments, storage controller 300 may be a storage controller in a system on a chip. For example, storage controller 300 may be utilized as on-chip storage controller 118, or off-chip storage controller 116 (FIG. 1). Storage controller 300 includes control block 302, command pointer register 220, command register 270, and register set 310. Command pointer register 220 and command register 270 are described above with reference to FIG. 2. Register set 310 includes range register 312, direction register 314, and write enable register 316.

In some embodiments, register set 310 and control block 302 represent a storage partitioning mechanism that may be used to logically partition a storage device into secure and non-secure partitions. For example, range register 312 may be used to hold the value of a boundary between secure and non-secure partitions such as the boundary at 126 in on-chip storage 120 or the boundary at 156 in off-chip storage 150 (FIG. 1). Also for example, direction register 314 may include a direction bit that signifies which direction the secure partition lies from the boundary, or which direction the non-secure partition lies from the boundary. In some embodiments, direction register 314 may include one direction bit, and in other embodiments, direction register 314 may include a plurality of bits. For example, in some embodiments, a direction bit may be included in a register that also includes other bits, such as control or status bits.

Write enable register 316 may be utilized to determine whether a particular storage partition may be written to by a non-secure process. For example, when storage controller 300 is performing a non-secure transaction that includes a write operation, control block 302 may consult the contents of write enable register 316 to determine if a non-secure write operation may write to a non-secure partition.

Control block 302 may be any type of control circuit capable of performing operations within storage controller 300. For example, control block 302 may include a state machine, a microcontroller, or the like. In operation, control block 302 receives requests for transactions on bus 130. For example, a bus master may utilize bus 130 to write a value into command pointer register 220 to start execution of a command chain, such as command chain 260 (FIG. 2). Further, control block 302 receives a secure/non-secure indication on bus 130 to indicate whether a secure process is requesting the transaction (a "secure transaction") or a non-secure process is requesting the transaction (a "non-secure transaction"). As described above with reference to FIG. 2, a secure process may set the security field in command pointer register to "secure," whereas a non-secure process may not.

Control block 302 may also include circuitry to raise an exception to a bus master on bus 130. For example, control block 302 may include circuitry to detect if a non-secure command is followed by a secure command, and may raise an exception to a bus master in response. Further, control block 302 may detect if a non-secure command is attempting to access secure memory, and may raise an exception in response.

In some embodiments, register set 310 includes additional configuration bits. For example, additional configuration bits might be instantiated to control whether an error is signaled, and how it is signaled. Additional status registers may also exist to capture details (such as the address) of an aborted transaction to aid in determining the source of the error. In some embodiments, all of the resources within register set 310 are secure resources that can only be written by a secure transaction.

Figure 4:
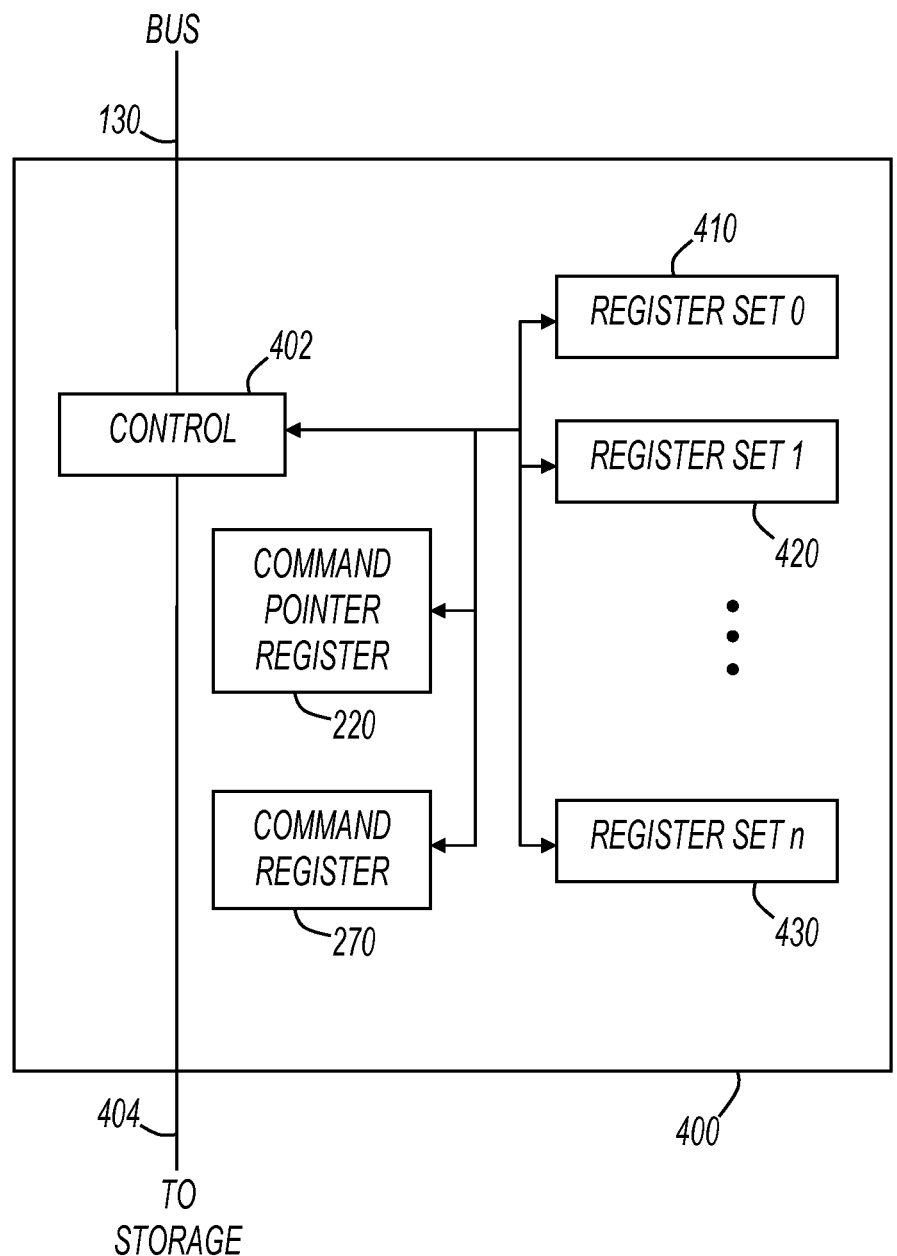

FIG. 4 shows a block diagram of a storage controller. In some embodiments, storage controller 400 may be utilized as a standalone storage controller, and in other embodiments, storage controller 400 may be a storage controller in a system on a chip. For example, storage controller 400 may be utilized as on-chip storage controller 118, or off-chip storage controller 116 (FIG. 1). Storage controller 400 includes control block 402, command pointer register 220, command register 270, and register sets 410, 420, and 430.

In some embodiments, each of register sets 410, 420, and 430 includes a range register, a direction register, and a write enable register, or equivalent structures. In some embodiments, the operation of each of the register sets 410, 420, and 430 corresponds to register set 310 (FIG. 3). Further, each of register sets 410, 420, and 430 may represent an independent storage partitioning mechanism. FIG. 4 shows n+1 register sets, where n is any integer.

In operation, each register set may be used to logically partition a storage device or a block in a storage device. For example, a block oriented Flash memory device may include n+1 blocks, and the n+1 register sets may be used to partition each of the blocks into secure and non-secure partitions.

In some embodiments, storage controller 400 may be used to control multiple external storage devices. For example, storage controller 400 may be used as storage controller 116, and signal lines 404 may correspond to signal lines 162 and 164 (FIG. 1). In other embodiments, storage controller 400 may be used to control an internal storage device. For example, storage controller 400 may be used as on-chip storage controller 118, and signal lines 404 may correspond to signal lines 119 (FIG. 1). In these embodiments, on-chip storage 120 (FIG. 1) may include multiple physically separate storage blocks, or may include one large physical storage block that may be divided into multiple secure partitions and multiple non-secure partitions.

In some embodiments, storage controller 400 may be utilized to partition a storage device into partitions with varying levels of security. For example, registers within register sets 410, 420, and 430 may be utilized to define a range of locations within a storage device for each security level. In some embodiments, storage controller 400 may be utilized to partition a storage device into regions that are identified by number. For example, registers within register sets 410, 420, and 430 may be utilized to define a range of locations within a storage device for each region.

Storage controllers, processors, memories, systems-on-chip, registers, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, custom devices, or the like. Likewise, any embodiment of the present invention can also be represented as a hard macro targeted to a specific manufacturing process. For example, storage controller 118 (FIG. 1) may be represented as polygons assigned to layers of an integrated circuit.

Figure 5:
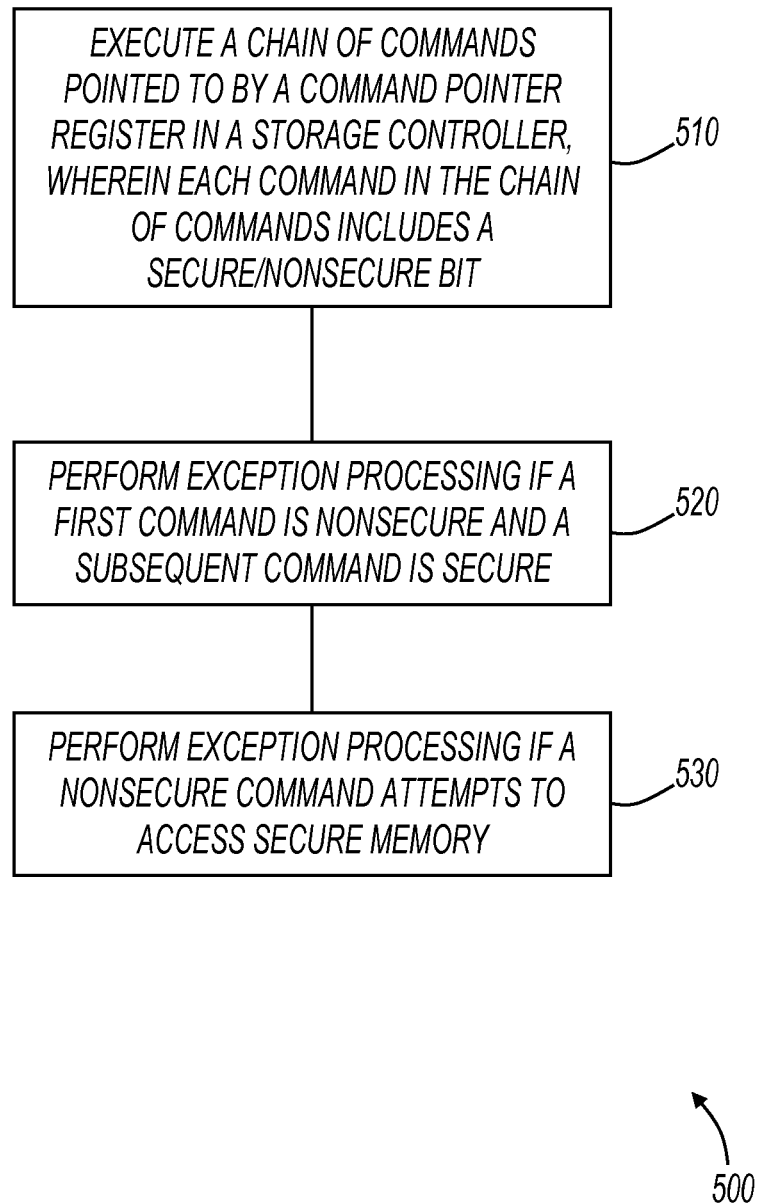
FIG. 5 shows a flowchart in accordance with various embodiments of the present invention.

FIG. 5 shows a flowchart in accordance with various embodiments of the present invention. In some embodiments, method 500, or portions thereof, is performed by a storage controller or a control block within a storage controller, embodiments of which are shown in the various figures. In other embodiments, method 500 is performed by a control circuit, an integrated circuit, a system on a chip, or an electronic system. Method 500 is not limited by the particular type of apparatus or software element performing the method. The various actions in method 500 may be performed in the order presented, or may be performed in a different order. Further, in some embodiments, some actions listed in FIG. 5 are omitted from method 500.

Method 500 is shown beginning with block 510. At 510, method 500 executes a chain of commands pointed to by a command pointer register in a storage controller. Each command in the chain of commands includes a secure/non-secure bit that identifies the security status of the following command in the command chain.

At 520, exception processing is performed if a first command is non-secure and a subsequent command is secure. This may occur when a non-secure command includes a secure/non-secure bit that identifies the next command in the chain as secure. Exception processing may be performed by raising an exception to a device external to the storage controller. For example, an exception may be raised to a processor or other bus master. Exception processing may also be performed completely within the storage controller.

At 530, exception processing is performed if a non-secure command attempts to access secure memory. This exception processing may be performed by raising an exception to a device external to the storage controller, or the exception processing may be performed completely within the storage controller.

Figure 6:
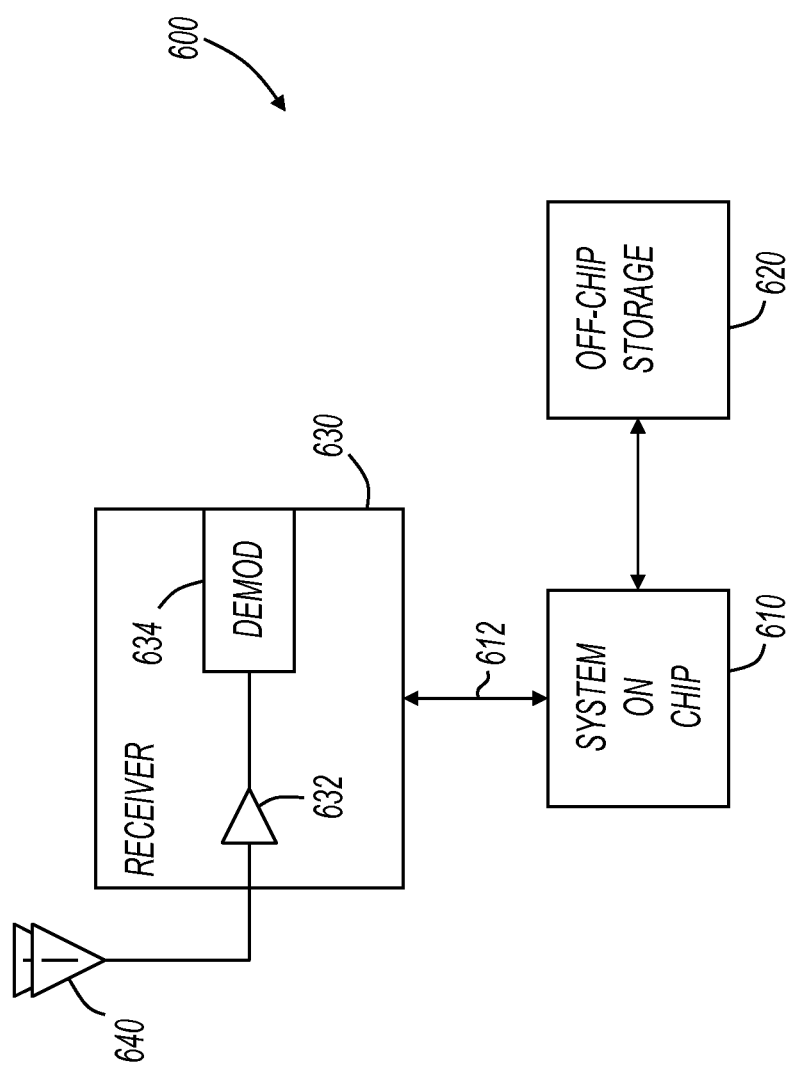
FIG. 6 shows a system diagram in accordance with various embodiments of the present invention.

FIG. 6 shows a system diagram in accordance with various embodiments of the present invention. FIG. 6 shows system 600 including system-on-chip (SOC) 610, off-chip storage 620, receiver 630, and antennas 640. SOC 610 may include one or more storage controllers capable of partitioning storage devices into secure and non-secure partitions as described with reference to the various embodiments of the invention. For example, SOC 610 may include storage controller 116 or 118 (FIG. 1), 300 (FIG. 3), or 400 (FIG. 4).

In systems represented by FIG. 6, SOC 610 is coupled to receiver 630 by conductor 612. Receiver 630 receives communications signals from antennas 640 and also communicates with SOC 610 on conductor 612. In some embodiments, receiver 630 provides communications data to SOC 610. Also in some embodiments, SOC 610 provides control information to receiver 630 on conductor 612.

Example systems represented by FIG. 6 include cellular phones, personal digital assistants, wireless local area network interfaces, and the like. Many other systems uses for SOC 610 exist. For example, SOC 610 may be used in a desktop computer, a network bridge or router, or any other system without a receiver.

Receiver 630 includes amplifier 632 and demodulator (demod) 634. In operation, amplifier 632 receives communications signals from antennas 640, and provides amplified signals to demod 634 for demodulation. For ease of illustration, frequency conversion and other signal processing is not shown. Frequency conversion can be performed before or after amplifier 632 without departing from the scope of the present invention. In some embodiments, receiver 630 may be a heterodyne receiver, and in other embodiments, receiver 630 may be a direct conversion receiver. In some embodiments, receiver 630 may include multiple receivers. For example, in embodiments with multiple antennas 640, each antenna may be coupled to a corresponding receiver.

Receiver 630 may be adapted to receive and demodulate signals of various formats and at various frequencies. For example, receiver 630 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The various embodiments of the present invention are not limited in this regard.

Antennas 640 may include one or more antennas. For example, antennas 640 may include a single directional antenna or an omni-directional antenna. As used herein, the term omni-directional antenna refers to any antenna having a substantially uniform pattern in at least one plane. For example, in some embodiments, antennas 640 may include a single omni-directional antenna such as a dipole antenna, or a quarter wave antenna. Also for example, in some embodiments, antennas 640 may include a single directional antenna such as a parabolic dish antenna or a Yagi antenna. In still further embodiments, antennas 640 include multiple physical antennas. For example, in some embodiments, multiple antennas are utilized for multiple-input-multiple-output (MIMO) processing or spatial-division multiple access (SDMA) processing.

Storage device 620 may be any type of block oriented storage device. For example, storage device 620 may be Flash memory, a disk drive, or the like. In some embodiments, storage device 620 is logically partitioned into secure and non-secure partitions by a storage controller within SOC 610. In other embodiments, memory 620 is partitioned into partitions having varying levels of security.

Although SOC 610 and receiver 630 are shown separate in FIG. 6, in some embodiments, the circuitry of SOC 610 and receiver 630 are combined in a single integrated circuit. Furthermore, receiver 630 can be any type of integrated circuit capable of processing communications signals. For example, receiver 630 can be an analog integrated circuit, a digital signal processor, a mixed-mode integrated circuit, or the like.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A storage controller comprising:
   a partitioning mechanism to partition a storage device into partitions having one of three or more levels of security, wherein the partitioning mechanism comprises register sets to define a range of locations within the storage device for each security level, and wherein the partitioning mechanism is coupled to be responsive to a plurality of signal lines provided on a bus by a bus master to indicate a security level in which the bus master is operating, and to allow execution of instructions in a partition only when the bus master is operating at a security level appropriate for the partition; and
   a command pointer register to point to a chain of commands, the command pointer register having a plurality of bits to signify the security level of a first command of the chain of commands, and wherein each command of the chain of commands is part of a node in the chain of commands, said each node including a command, an address field to point to a next command, and a storage area to indicate a security level of the next command.

2. The storage controller of claim 1 further comprising a command register into which commands from the chain of commands are copied as they are executed.

3. The storage controller of claim 2 wherein the command register includes a plurality of bits to signify the security level of a command in the command register.

4. The storage controller of claim 1 wherein at least one of the register sets comprises a first register to define a boundary between partitions of different security levels, and a second register to define which side of the boundary the partitions of different security levels lie.

5. The storage controller of claim 1 further comprising circuitry to raise an exception if a secure command follows a non-secure command in the chain of commands.

6. A storage controller comprising:
   a partitioning mechanism to partition memory into secure and non-secure partitions;
   a command pointer register to point to a chain of commands, the command pointer register having a bit to signify the security level of a first command of the chain of commands, and wherein each command of the chain of commands is part of a node in the chain of commands, said each node including a command, an address field to point to a next command, and a storage area to indicate a security level of the next command; and
   circuitry to raise an exception when a secure command follows a non-secure command in the chain of commands.

7. The storage controller of claim 6 further comprising a command register into which commands are copied as they are executed.

8. The storage controller of claim 6 wherein the partitioning mechanism comprises at least one register to define a boundary between a secure and non-secure partition.

9. The storage controller of claim 6 wherein the partitioning mechanism further comprises a second register to define which side of the boundary the secure partition lies.

10. The storage controller of claim 6 wherein the storage controller is responsive to a signal provided by a bus master that indicates whether the storage controller is operating in a secure mode or a non-secure mode.

11. A method comprising:
    copying a command to be executed into a command register in a controller from a node in a chain of commands in memory, where each node includes a command field, an address field to point to a next command, and a storage area to indicate a security level of a next command;
    reading the storage area to determine the security level of the next command; and
    taking action based on at least one of: the security level of the current command, the security level of the next command, and a security mode in which the controller is operating.

12. The method of claim 11 wherein taking action comprises raising an exception when the security mode is non-secure and the security level of the next command is secure.

13. The method of claim 11 wherein taking action comprises raising an exception when the security level of the current command is non-secure and the security level of the next command secure.

14. The method of claim 11 wherein taking action comprises executing the next command when the security level of the current command is secure and the security level of the next command is non-secure.

15. The method of claim 11 wherein taking action comprises executing the next command when the security mode is secure and the security level of the next command is non-secure.

16. A method comprising:
    executing a chain of commands pointed to by a command pointer register in a storage controller, wherein each command in the chain of commands is part of a node, wherein each node includes a command, an address of a next command, and a secure/non-secure bit to indicate a security level of the next command; and
    performing exception processing if a first command in the chain of commands is non-secure and a subsequent command in the chain of commands is secure.

17. The method of claim 16 wherein performing exception processing comprises alerting a bus master.

18. The method of claim 17 wherein alerting a bus master comprises alerting a processor.

19. The method of claim 16 further comprising performing exception processing if a non-secure command attempts to access secure memory.

* * * * *

UNITED STATES PATENT AND TRADEMARK OFFICE
CERTIFICATE OF CORRECTION

PATENT NO. : 8,448,239 B2
APPLICATION NO. : 13/041379
DATED : May 21, 2013
INVENTOR(S) : Dennis M. O'Connor et al.

It is certified that error appears in the above-identified patent and that said Letters Patent is hereby corrected as shown below:

In the Claims

In column 10, line 27, in Claim 13, delete "command" and insert -- command is --, therefor.

Signed and Sealed this
Sixteenth Day of July, 2013

Teresa Stanek Rea
*Acting Director of the United States Patent and Trademark Office*